J. L. PERKINS AND F. W. SICKLES.
BROACH.
APPLICATION FILED FEB. 24, 1919.
1,370,837.
Patented Mar. 8, 1921.
2 SHEETS—SHEET 1.
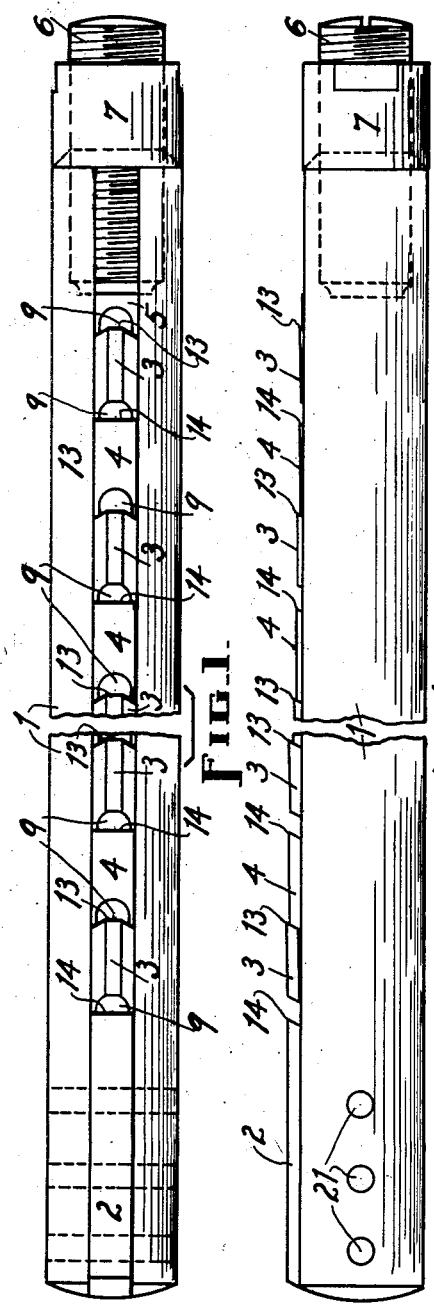
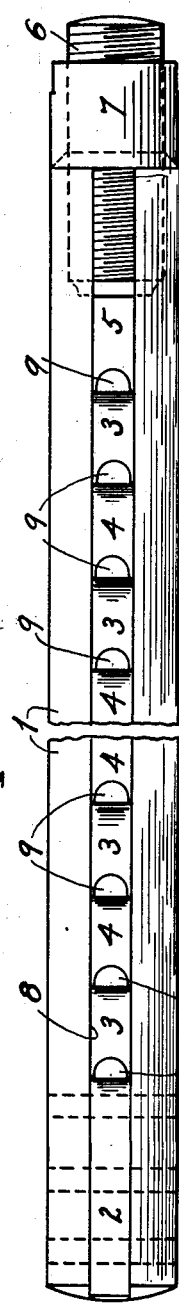
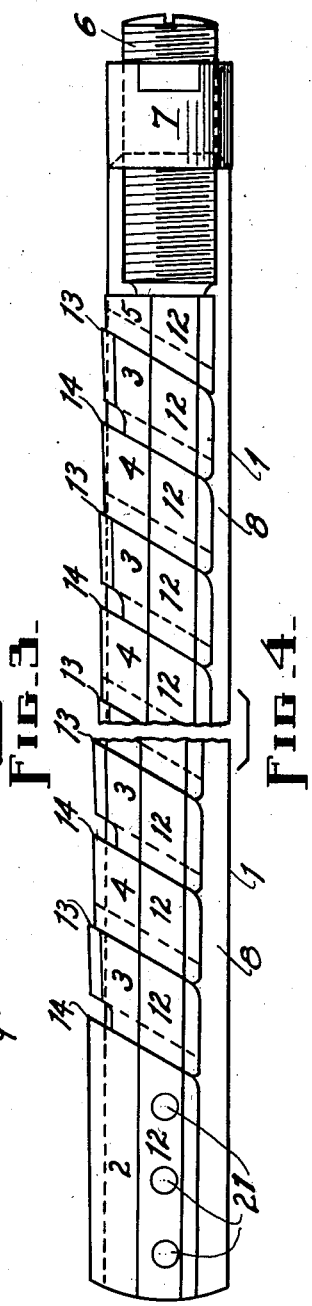
WITNESS:
C. C. West
INVENTOR.
Julian L. Perkins
Frank W. Sickles,
BY
Frank A. Cutter,
ATTORNEY.

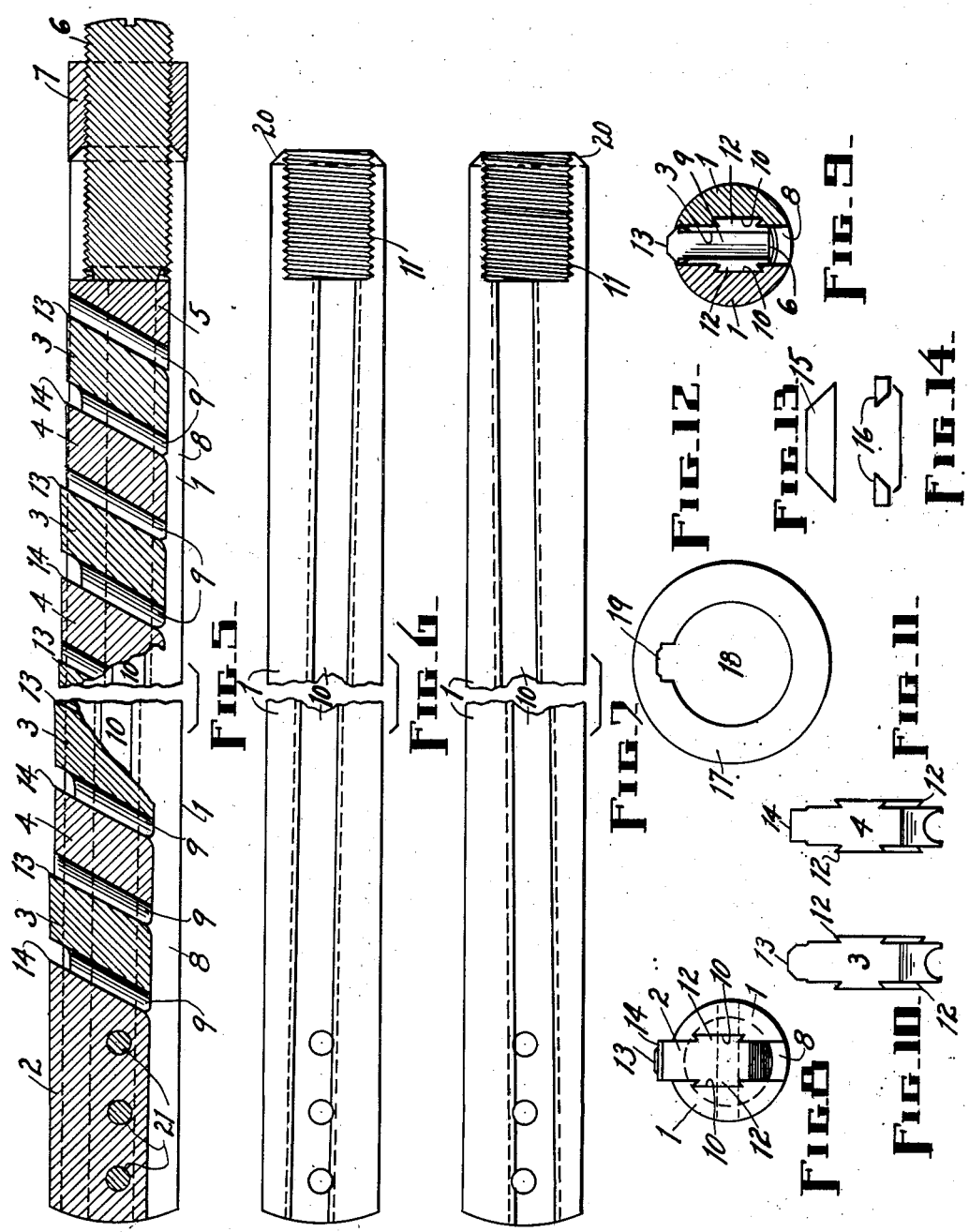

UNITED STATES PATENT OFFICE.

JULIAN L. PERKINS, OF WEST SPRINGFIELD, AND FRANK W. SICKLES, OF SPRINGFIELD, MASSACHUSETTS, ASSIGNORS TO PERKINS APPLIANCE COMPANY, OF SPRINGFIELD, MASSACHUSETTS, A CORPORATION OF MASSACHUSETTS.

BROACH.

1,370,837.          Specification of Letters Patent.      Patented Mar. 8, 1921.

Application filed February 24, 1919. Serial No. 278,724.

*To all whom it may concern:*

Be it known that we, JULIAN L. PERKINS and FRANK W. SICKLES, both citizens of the United States of America, and residents of Springfield, in the county of Hampden and State of Massachusetts, have invented a new and useful Broach, of which the following is a specification.

Our invention relates to improvements in tools or implements designed to cut grooves in the interiors of hollow cylindrical objects, such as key-ways in the hubs of pulleys for example, and resides in a split, divided, or sectional shank, and a plurality of separate and independent teeth of peculiar construction, and which are adapted to interlock with the shank sections, together with such other parts and members as may be necessary or desirable in order to make the broach complete and render it serviceable, all as hereinafter set forth.

One object of our invention is to produce a broach which has both removable and interchangeable teeth, so that repairs can be easily and quickly made by replacement, and it does not become necessary to discard the entire tool. In other words, any of the teeth of this broach which become broken or otherwise damaged can without difficulty be removed and new ones put in their places. Thus the broach is durable and economical.

As stated above the teeth are interchangeable, hence they can be made in quantities and supplied as needed. The divided shank or holder, in which the teeth are received and securely held, is capable of very long life, inasmuch as the same will seldom be injured or become broken.

Another object is to produce a broach which cuts a finished groove of varying depths, so that the interior wall of such groove, interior as distinguished from the walls which extend from the main passage to said first-named wall, and will herein be termed side walls, affords two bearing surfaces on opposite sides of a cut of slightly greater depth. To this end we prefer to employ two slightly different types of teeth, that is, their cutting edges are slightly different, as will presently appear more fully. It follows, therefore, that when we say the teeth of our broach are interchangeable, it is to be understood that, for practical purposes, the teeth of the two types can not be changed the one for the other. This fact does not, however, detract from the value of the interchangeable feature, beyond the requirement for two types or styles of teeth instead of one.

Still another object is to afford simple but strong, durable, accurate, and convenient means, in a broach of this kind, for interlocking the separable parts and members to produce a solid, rigid, and stable structure, and yet such means of such a nature that said parts and members can readily be released and separated again.

A further object is to provide the broach with means to cut chips of different widths and thicknesses. This greatly facilitates the movements of the chips cut by the broach, and increases and enhances the ability of said broach to clear itself of said chips. It is due to the divided-chip feature, or to the means whereby the divided chips are produced, that the interior wall of the groove cut by the broach has the form of which mention has been made.

The broach as a whole is not only strong, durable, convenient, and economical, but entirely practicable and highly efficient.

Other objects and advantages will appear in the course of the following description.

A preferred embodiment of the invention, whereby we attain the objects and secure the advantages of the same, is illustrated in the accompanying drawings, and we will proceed to describe said invention with reference to said drawings, although it is to be understood that the form, construction, arrangement, etc. of the parts in various aspects are not material and may be modified without departure from the spirit of the invention.

In the drawings, in which like numerals designate like parts throughout the several views, Figure 1 is a top plan of a broach which embodies a practical form of our invention as aforesaid, the middle portion of this view, and of the other longitudinal views as well, being broken out to economize space; Fig. 2, a side elevation of said broach; Fig. 3, a bottom plan of the same; Fig. 4, a side elevation of the broach as it would appear if the near shank section were removed; Fig. 5, a central longitudinal section through said broach; Fig. 6, an inside elevation of one of the shank sections; Fig. 7, an inside elevation of the other of said sections; Fig. 8, a rear end elevation of the broach; Fig. 9, a transverse section through the broach, the tooth shown therein appearing in rear-end elevation; Fig. 10, a front-end elevation of a tooth of one of the two types, the tooth being so positioned that the front end itself is perpendicular; Fig. 11, a similar view, but showing a tooth of the other type; Fig. 12, an end elevation of an object having therein a finished groove such as would be cut with this broach; Fig. 13, a greatly enlarged, end elevation of a chip such as would be cut by a tooth of one type, and, Fig. 14, a similar view of two chips such as would be cut by a tooth of the other type.

The complete broach, as it appears in Figs. 1, 2, 3, and 8, comprises two shank sections 1, a toothed abutment block 2 at the rear end, a plurality of alternately-arranged teeth 3 and 4, an abutment block 5 in front of the foremost or leading tooth, a lock-bolt or screw 6 in front of said last-named block, and a lock nut 7 on said screw, and has in the bottom thereof a longitudinal chip-clearance passage 8, and a plurality of transverse or lateral chip-clearance passages 9. The passage 8 opens through the bottom and both ends of the broach, except where it is closed by the nut 7, and the passages 9 open at their inner ends into said passage 8, and at their outer ends through the top of said broach. These passages correspond to similar passages included in and covered by United States Letters Patent, No. 1,121,126.

Referring next more especially to Figs. 6, 7, 8, and 9, it will be seen that each shank section 1 has in its inner face a longitudinal, dovetail slot or groove 10 which is arranged on an upward incline from front to rear, and that the front end portion of such section, inside, is screw-threaded, as at 11, said groove opening at the front end into the screw-threaded part of the section, and at the rear end through the corresponding end of the section. It is due to these inclined grooves 10, together with the construction of the teeth 3 and 4, as will hereinafter more fully appear, that we are able to employ teeth which are all of the same size and shape, with the exception of the two styles of cutting edges, and therefore interchangeable, and with such teeth to cut progressively grooves or slots of the required depth. This is true because the grooves 10 position each tooth which is behind the foremost tooth a little higher than the one in front, it being assumed for the purpose of this description that the position of the broach described is such as to locate the exposed or projecting portions of the teeth above, and the clearance passage 8 below, as represented in the drawings.

The teeth 3 and 4 and the blocks 2 and 5 have dovetail lugs 12 on the sides to fit the dovetail grooves 10 and interlock with the undercut edges thereof. The said teeth and blocks have bottom edges which are in alinement, when such members are in place in the shank or holder, and form the top of the greater part of the passage 8, the remainder and unimportant part of such passage being formed by the screw 6 when in position, and said bottom edges, the top and bottom edges of the lugs 12, and the grooves 10 are all in parallel planes. The front end of the block 2, the rear end of the block 5, and both ends of each of the teeth 3 and 4 are inclined, from above, downwardly and rearwardly, and the passages 9 are formed by grooves in the rear ends of said block 5 and teeth, which grooves extend from the tops to the bottoms of the members in which they are located.

Herein, the teeth 3 are termed single-cutting teeth, because each has at the place where the top and the front end thereof join a cutting edge 13, which cuts a single chip, as represented at 15 in Fig. 13; while the teeth 4 are termed double-cutting teeth, because each has at the place where the top and the front end thereof join a cutting edge 14, which cuts two chips, as represented at 16 in Fig. 14. Each cutting edge 13 is beveled on the sides so that, in cross section, the chip (15) cut thereby is narrower above than below and has beveled edges, and necessarily and obviously the groove from which such chip is removed is similarly shaped in cross section. Each cutting edge 14 has parallel sides and consequently would cut a rectangular chip, in cross section, were it not for the fact that, in this broach, said cutting edge follows one of the cutting edges 13 and removes portions only of the parts left on opposite sides of the preceding cut made by such cutting edge 13. The cutting edge 13 does not cut to its full depth nor as wide a groove or slot as does the cutting edge 14, consequently the latter removes the beveled portions left by the former, and widens said slot to the full width. If this last were not true the chips 16 would be right-angle triangles in cross section, without under surfaces which are parallel with the upper surfaces. Such under surfaces are shorter than such upper surfaces, because the chips include the beveled portions left when the chip 15 is removed. The projection of the cutting edges 13 is slightly more than that of the cutting edges 14, relatively, which accounts for the fact that the chips 16 are thinner than the chip 15, and the finished slot cut by said cutting edges has a deeper central portion. In this connection attention is called to Fig. 12, wherein an annulus is represented at 17, in which is a central bore 18, and a slot 19 which it is assumed has been cut with this broach. The deepened center of the slot 19 is plainly to be seen in said view.

The broaching operation is rendered much easier, the work can be done more expeditiously, and the results obtained are superior, on account of the manner in which the material is removed to form the slot.

Moreover, the broach is capable of clearing itself to much better advantage and with far greater certainty, on account of the provision whereby the chips are cut in series, groups, or sets each including one wide and two narrow chips. This is an advantage of the utmost importance.

The abutment cutting block 2, like the teeth 4, is provided at its front end with a cutting edge 14.

The front ends of the sections 1 are chamfered, as shown at 20 in Figs. 6 and 7, and the lock nut 7 is cupped at its rear end to fit said chamfered parts.

Some means must be provided to aline or to retain in alinement the sections 1 at the ends, and to furnish an abutment at the rear end of the broach, against which the teeth can be forced, for clamping and locking purposes, by the screw 6, and such means here consists of the block 2, together with some suitable element or elements for fastening the parts together, such as pins 21. The pins 21 are driven laterally through the sections 1 and block 2. In this manner the sections 1 are held together permanently, although they can be separated from the block 2 if desired, by driving out the pins 21.

In assembling the broach, the teeth 3 and 4 are first introduced between the sections 1 at the front end, with their clearance-passage-forming grooves 9 toward the rear and their cutting edges 13 and 14 toward the front, the dovetail lugs 12 being inserted in the dovetail grooves 10, and a tooth 3 preceding and another following each tooth 4. The block 5 is then slipped into place with its clearance groove 9 toward the rear. Next the screw 6 is inserted in the tapped portions of the holder and turned in until its inner end bears against the front end of the block 5, such end being perpendicular to the axis of the broach, and said screw forces and crowds the intervening members between the block 2 and said screw tightly together, with the rearmost tooth 3 against said block 2. The teeth and the block 5 slide freely so that this can be done readily. Finally the nut 7 is screwed tightly against the front ends of the sections 1, and engages and securely holds the chamfered parts 20. A rigid and solid implement, in the form of a complete broach which is ready for use, is thus produced. The dovetail connections and the end abutments securely interlock the sections 1 and the members supported therebetween, and cause such members to form a rigid and immovable line. This latter is due partly to the fact that the pressure or force exerted by the screw 6, when turned in, and transmitted to said members, crowds them together, with their oblique ends in contiguity, and upwardly so that the lugs 12 tightly engage the lips of the grooves 10.

In the event it be desired to remove any one or more of the teeth for any reason, it is simply necessary to loosen the lock nut 7, unscrew and remove the screw 6, slip the abutment block 5 from between the sections 1, and then in the same way take out the leading tooth and as many others, up to the entire number, as may be required. The teeth which are removed or duplicates thereof are subsequently placed in the holder and secured therein, in the same manner as before.

The shank sections 1 are segmental in cross section, and of a radius which is the same in length as that of the nut 7, the latter being round. And the thickness of the members between said sections and the diameter of the screw 6 are such as to separate the sections the right amount to cause their exterior surfaces to coincide exactly with the exterior surface of said nut. Thus the broach holder, starting with the nut 7, is capable of fitting the bore, as 18 in the annulus 17, and engaging the sides thereof, throughout the entire length of such holder.

The broach is adapted to be operated from either end, that is to say, either to be forced from the rear end through the work, which is the more usual manner, or to be drawn by the front end through the work. If the broach is to be pulled instead of pushed through the work, attachment is made to that part of the screw 6 that extends forward of the nut 7.

Although the operation of the broach will be very well understood from the foregoing description, it is briefly set forth as follows:

The front end of the broach is inserted in the bore 18 of the annulus, or in a similar bore through some other object, and forcibly actuated through such bore. The leading tooth 3 first cuts a slot which yields a wide chip (15) that passes down the front end of said tooth, through the passage 9 in the block 5 into the passage 8, and escapes through the bottom or at the rear end of said last-named passage. The foremost tooth 4 next widens the slot, without cutting quite so deep as said first-named tooth, and produces a pair of narrow chips (16). These chips pass down the front end of the foremost tooth 4, through the passage 9 in the leading tooth 3 into the passage 8, and escape through the bottom or at the rear end of said last-named passage. In a similar manner the next two teeth 3 and 4 operate, with the result that the slot in the annulus 17 is deepened, and so with regard to each succeeding pair of contiguous teeth 3 and 4, until the slot 19 is produced. The final cut in the slot 19 is made by the cutting edge 14 of the abutment cutting block which widens or increases at the sides the cut made by the rearmost tooth 3, but does not cut away the center of the slot, so that the middle portion of the inner wall of said slot is slightly deeper than the side portions of said wall, and the sides of the deeper middle portion flare in correspondence or agreement with the tapered parts of the cutting edge 13 of any tooth 3. When the broach leaves the bore 18 the slot 19 is complete.

The block 2 may project above or beyond the sections 1, behind the cutting edge 14 with which said block is provided and clear to the back end of said block, to serve as a substantial guide for the rear end of the broach. Such projecting portion of the block 2 passes through the slot 19 after the last cut is made, and is embraced and held to its course by the side walls of said slot, thus being guided and in turn guiding the broach.

The maximum depth of cut made by our broach depends upon the length of the broach, or rather the number of teeth or cutting edges with which the broach is provided. For example, if a broach have twelve teeth, (including the front end portion of the block 2, which to all intents and purposes constitutes a tooth similar to one of the teeth 4), and the slot cut therewith be one-eighth of an inch deep, a broach having one-half that number of teeth, but otherwise similar to the first, will cut a slot one-sixteenth of an inch deep. The teeth in the shorter broach must naturally correspond with the first six teeth in the longer broach, or, in other words, the shorter broach or the tooth-provided portion thereof will be similar in all respects to that portion of the longer broach in which the first six teeth are located, except that the abutment cutting block in said shorter broach will take the place of the sixth tooth in said longer broach.

What we claim as our invention, and desire to secure by Letters Patent, is—

1. A broach provided with teeth having wide and narrow cutting parts adapted to cut transversely a slot which varies in width as well as depth during the cutting operation, whereby a less amount of work is required to be done by each tooth.

2. A broach provided with teeth adapted to cut progressively a narrow slot, and with teeth alternating with the others and adapted to widen the slot cut by said first-named teeth.

3. A broach provided with teeth adapted to cut progressively a narrow slot having tapered sides, and with teeth adapted to widen the slot cut by said first-named teeth, the sides of the slot cut by said second-named teeth being parallel.

4. A broach provided with teeth adapted progressively to cut a narrow slot, and with teeth adapted to widen the slot cut by said first-named teeth, the teeth in the two sets being alternately arranged, and each tooth in the first set cutting deeper than the following tooth in the second set.

5. In a broach, a divided shank provided with means to position removable teeth of equal lengths at an upward incline from front to rear, and teeth attachable to such shank.

6. In a broach, a divided shank having interior inclined grooves, and teeth of equal lengths provided with uniformly located lugs which are receivable in said grooves.

7. A broach comprising a divided shank having interior inclined dovetail grooves, teeth of equal lengths provided with uniformly located dovetail lugs to fit said grooves, and end abutments for said teeth.

8. A broach comprising a divided shank having interior inclined supporting and interlocking means for teeth, teeth receivable in said shank and provided with interlocking means, the amount of projection of the teeth beyond the shank varying and being determined by the inclination of said supporting means, and securing means for said teeth at the ends of said shank.

9. A broach comprising shank sections having interior inclined tooth-supporting and -interlocking means, abutments, and teeth receivable between said sections and provided with shank-section-interlocking means, one of said abutments being rigidly secured to said sections, and a removable locking member for said sections at one end.

10. A broach comprising shank sections having interior inclined tooth-supporting and -interlocking means, and being interiorly threaded at one terminal, abutments and teeth receivable between said sections and provided with shank-section-interlocking means, one of said abutments being rigidly secured to said sections, and a screw receivable in the threaded portions of said sections.

11. A broach comprising shank sections having interior inclined tooth-supporting and -interlocking means, and being interiorly threaded at one terminal, abutments and teeth receivable between said sections and provided with shank-section-interlocking means, one of said abutments being rigidly secured to said sections, a screw receivable in the threaded portions of said sections, and a nut on said screw to engage the front ends of said sections.

12. The combination, in a broach, of shank sections having interior inclined tooth-supporting and -interlocking means, abutments and teeth receivable between said sections and provided with shank-section-interlocking means, said teeth and one of said abutments having chip passages in their rear ends, and said abutments and teeth being arranged with their inner edges above the adjacent edges of said sections, to form a longitudinal chip passage into which said first-mentioned chip passages open at their inner ends, means to hold one of said abutments against endwise movement, and locking means for the other of said abutments and said teeth.

13. In a broach, shank sections having interior inclined tooth-supporting means, teeth receivable between said sections and engageable by said means, the foremost and every alternate tooth having narrow cutting edges, and the other teeth having wide cutting edges, and means to hold said teeth against endwise movement.

14. In a broach, shank sections having interior inclined tooth-supporting means, abutments and teeth receivable between said sections and engageable by said means, the foremost and every alternate tooth having narrow cutting edges, and the other teeth and one of said abutments having wide cutting edges, and means to hold said abutments and teeth against endwise movement.

15. A broach comprising a divided shank having interior inclined tooth-supporting means, and provided at both ends with holding means for teeth, such means at one end being removable, and teeth of equal lengths receivable in said shank, between said holding means, and engageable by said first-named means.

16. A broach comprising a divided shank, and interchangeable removable teeth of equal lengths.

17. A broach comprising a divided shank having interior inclined tooth-supporting means, and interchangeable teeth of equal lengths receivable in said shank and engageable by said means.

18. A broach comprising a divided shank, and interchangeable removable teeth, a portion of such teeth having narrow cutting edges and the other portion having wide cutting edges.

19. A broach comprising a divided shank, and interchangeable removable teeth, a portion of such teeth having narrow cutting edges and the other portion having wide cutting edges, the arrangement being such that each tooth which has a narrow cutting edge cuts deeper than the following tooth which has a wide cutting edge.

20. The combination, in a broach, with shank sections having interior inclined dovetail grooves, and being threaded at their forward terminals, front and rear abutments and teeth receivable between said sections and having lateral lugs to enter said grooves and engage the lips thereof, means to secure said rear abutment to said sections and hold the same against endwise movement therebetween, and a screw adapted to engage the threaded portions of said sections, said rear abutment having a cutting edge at its front end, and said front abutment and said teeth having chip-clearance passages in their rear ends, the arrangement of parts being such that there is a longitudinal chip-clearance passage between said sections into which said first-named passages open at their inner ends.

21. The combination, in a broach, with shank sections having interior inclined dovetail grooves, and being threaded at their forward terminals, front and rear abutments and teeth receivable between said sections and having lateral lugs to enter said grooves and engage the lips thereof, means to secure said rear abutment to said sections and hold the same against endwise movement therebetween, a screw adapted to engage the threaded portions of said sections, and a nut on said screw to engage the front ends of said sections, said rear abutment having a cutting edge at its front end, and said front abutment and said teeth having chip-clearance passages in their rear ends, the arrangement of parts being such that there is a longitudinal chip-clearance passage between said sections into which said first-named passages open at their inner ends.

22. The combination, in a broach, with shank sections having interior inclined dovetail grooves, and being threaded at their forward terminals, front and rear abutments and teeth receivable between said sections and having lateral lugs to enter said grooves and engage the lips thereof, removable means to secure said rear abutment to said sections and hold the same against endwise movement therebetween, and a screw adapted to engage the threaded portions of said sections, said rear abutment having a cutting edge at its front end, and said front abutment and said teeth having chip-clearance passages in their rear ends, the arrangement of parts being such that there is a longitudinal chip-clearance passage between said sections into which said first-named passages open at their inner ends.

JULIAN L. PERKINS.
FRANK W. SICKLES.

Witnesses:
JAMES A. PERKINS,
A. C. FAIRBANKS.